L. O. GASSETT.
Compound Valve for Pumping Fluids, Gases, &c.

No. 213,186. Patented Mar. 11, 1879.

Witnesses:
E. L. Roberts
Nath'l P. Goodhue

Inventor:
Lovel Otis Gassett

UNITED STATES PATENT OFFICE.

LOVEL O. GASSETT, OF CLEVELAND, OHIO, ASSIGNOR TO HIMSELF AND EDWARD A. L. ROBERTS, OF TITUSVILLE, PENNSYLVANIA.

IMPROVEMENT IN COMPOUND VALVES FOR PUMPING FLUIDS, GASES, &c.

Specification forming part of Letters Patent No. 213,186, dated March 11, 1879; application filed January 17, 1879.

*To all whom it may concern:*

Be it known that I, LOVEL O. GASSETT, of Cleveland, in the county of Cuyahoga, State of Ohio, have invented a new and Improved Compound Valve for Pumping Fluids, Gases, and Semi-Fluids; and I do hereby declare that the following is a full and exact description thereof, reference being had to the accompanying drawings, and to the letters of reference marked thereon.

The nature of my invention consists of two or more valves, the second set inside of the first, the third set inside of the second, the fourth set inside of the third, and so on to any extent desirable, and may consist of cups, or cups and ball combined.

The object of this improvement is to give less rise or motion to the valve, in order to get the required amount of opening or area for the passage of fluids, gases, and semi-fluids; and it has the advantage that, if desirable, any number of cup or pocket valves may be combined, terminating in a ball-valve, thereby securing the benefits of several sorts of valves in one valve.

Valves constructed as specified will work more freely, with less wear, and with less pounding than single-seated valves, and if one of the cups should become stuck or disarranged, the other or others will continue to work, frequently jarring the stuck valve loose.

Figure 1:
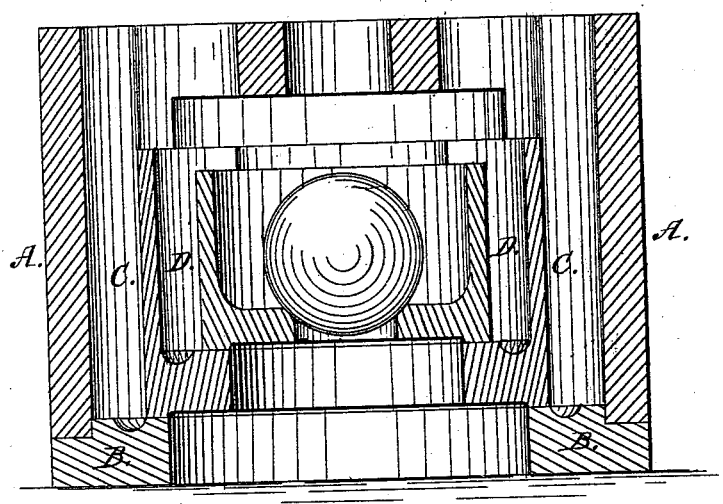
Figure 2:
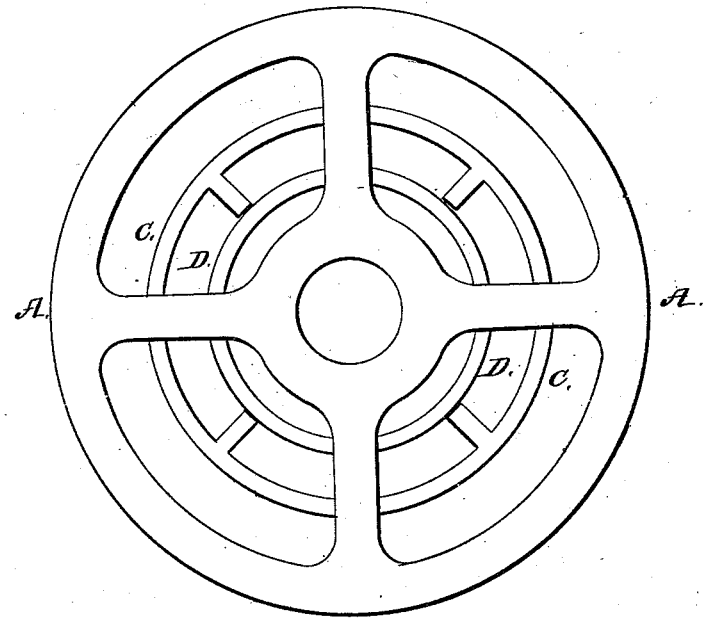

In the drawings, Figure 1 is a vertical cross-section, and Fig. 2 a plan view, of the device.

In constructing my compound valve, I construct a cage (marked A in the drawings) with a seat, (marked B,) the cage made to receive the large valve C. The large valve is so constructed as to form of itself the cage to receive the next smaller valve, and so on. D represents the second valve; and it may be made precisely like the first valve, with a cage to contain the second, or it may be made with a ball. In short, the cage and seat are constructed as in a single-seated valve, and then each valve is itself a seat for the next smaller valve; and any number of valves may be thus constructed, terminating with a ball-valve.

What I claim as my invention, and desire to secure by Letters Patent, is—

A compound valve, substantially as above described, consisting of two or more valves, either cup and pocket, combined together, or either of them combined with a ball-valve.

LOVEL OTIS GASSETT.

Witnesses:
 E. A. L. ROBERTS,
 L. B. SILLIMAN.